United States Patent
Tang (10) Patent No.: US 12,095,134 B2
(45) Date of Patent: Sep. 17, 2024

(54) PREPARATION METHOD, APPARATUS, AND DEVICE FOR COPLANAR WAVEGUIDE STRUCTURE, AND SUPERCONDUCTING DEVICE

(71) Applicant: Alibaba (China) Co., Ltd., Zhejiang (CN)

(72) Inventor: Chengchun Tang, Hangzhou (CN)

(73) Assignee: Alibaba (China) Co., Ltd., Hangzhou (CN)

( * ) Notice: Subject to any disclaimer, the term of this patent is extended or adjusted under 35 U.S.C. 154(b) by 459 days.

(21) Appl. No.: 17/651,334

(22) Filed: Feb. 16, 2022

(65) Prior Publication Data
US 2022/0285819 A1    Sep. 8, 2022

(30) Foreign Application Priority Data
Mar. 2, 2021 (CN) .......................... 202110231228.1

(51) Int. Cl.
   H01P 11/00    (2006.01)
   C23F 1/20     (2006.01)
   H01P 3/00     (2006.01)

(52) U.S. Cl.
   CPC .............. H01P 11/003 (2013.01); C23F 1/20 (2013.01); H01P 3/003 (2013.01)

(58) Field of Classification Search
   CPC .. C23F 1/20; C23F 1/36; H01P 11/003; H01P 3/003; C09K 13/02
   See application file for complete search history.

(56) References Cited

U.S. PATENT DOCUMENTS

| 2011/0024750 A1* | 2/2011 | Yamazaki | ......... G02F 1/136227 |
| | | | 257/E29.296 |
| 2011/0024751 A1* | 2/2011 | Yamazaki | ........... H01L 29/7869 |
| | | | 257/E27.111 |
| 2011/0037068 A1* | 2/2011 | Yamazaki | ......... H01L 21/02614 |
| | | | 257/E29.296 |
| 2011/0143486 A1* | 6/2011 | Hama | ................. H01L 31/1804 |
| | | | 438/72 |

\* cited by examiner

*Primary Examiner* — Jaehwan Oh
(74) *Attorney, Agent, or Firm* — Finnegan, Henderson, Farabow, Garrett & Dunner, LLP (57) ABSTRACT

A method for preparing a coplanar waveguide structure includes acquiring a structure to be etched, the structure to be etched including an aluminum film provided on a substrate structure and a photoresist structure provided at an upper end of the aluminum film, wherein the photoresist structure is configured to cover partial areas of the aluminum film; performing a first etching operation on the aluminum film provided on the substrate structure by using an acidic solution to obtain a first etched structure; rinsing the first etched structure to obtain an intermediate structure; performing a second etching operation on the intermediate structure by using an alkaline solution to obtain a second etched structure; and rinsing the second etched structure to obtain a target structure for generating a coplanar waveguide structure, the target structure including the aluminum film and the photoresist structure, wherein the photoresist structure covers all areas of the aluminum film.

16 Claims, 7 Drawing Sheets

PREPARATION METHOD, APPARATUS, AND DEVICE FOR COPLANAR WAVEGUIDE STRUCTURE, AND SUPERCONDUCTING DEVICE

CROSS-REFERENCE TO RELATED APPLICATIONS

The disclosure claims the benefits of priority to Chinese Application No. 202110231228.1, filed on Mar. 2, 2021, which is incorporated herein by reference in its entirety.

TECHNICAL FIELD

The present disclosure relates to the field of superconducting technologies, and in particular, to a preparation method, an apparatus, and a device for a coplanar waveguide structure, and a superconducting device.

BACKGROUND

Wet etching is a method for realizing micro-nano size structure processing through mask protection and chemical reaction. It is a commonly used processing method in the field of micro-nano processing and has advantages such as simple implementation and low cost. However, the wet etching method also has certain chemo-selectivity. In a wet preparation process of aluminum-based superconducting quantum microwave waveguides, some micro-nano granular impurities are often left due to the selectivity of chemical corrosion. A charging effect of these impurities will interfere with signals of quantum devices, which will affect the preparation quality and effect of the quantum devices.

SUMMARY OF THE DISCLOSURE

Embodiments of the present disclosure provide a method for preparing a coplanar waveguide structure. The preparation method includes: acquiring a structure to be etched, the structure to be etched including an aluminum film provided on a substrate structure and a photoresist structure provided at an upper end of the aluminum film, wherein the photoresist structure is configured to cover partial areas of the aluminum film; performing a first etching operation on the aluminum film provided on the substrate structure by using an acidic solution to obtain a first etched structure; rinsing the first etched structure to obtain an intermediate structure; performing a second etching operation on the intermediate structure by using an alkaline solution to obtain a second etched structure; and rinsing the second etched structure to obtain a target structure for generating a coplanar waveguide structure, the target structure including the aluminum film provided on the substrate structure and the photoresist structure provided at the upper end of the aluminum film, wherein the photoresist structure covers all areas of the aluminum film.

Embodiments of the present disclosure provide an apparatus for preparing a coplanar waveguide structure. The apparatus is configured to acquire a structure to be etched, the structure to be etched comprising an aluminum film provided on a substrate structure and a photoresist structure provided at an upper end of the aluminum film, wherein the photoresist structure is configured to cover partial areas of the aluminum film, the apparatus comprising an etching component configured to perform a first etching operation on the aluminum film provided on the substrate structure by using an acidic solution to obtain a first etched structure and configured to perform a second etching operation on the intermediate structure by using an alkaline solution to obtain a second etched structure; and a rinsing component configured to rinse the first etched structure to obtain an intermediate structure and configured to rinse the second etched structure to obtain a target structure for generating a coplanar waveguide structure, wherein the target structure comprises the aluminum film provided on the substrate structure and the photoresist structure provided at the upper end of the aluminum film, and the photoresist structure covers all areas of the aluminum film.

Embodiments of the present disclosure provide a device for preparing a coplanar waveguide structure. The device includes a memory and a processor. The memory is configured to store one or more computer instructions, and the one or more computer instructions, when executed by the processor, implement the above-described method for preparing a coplanar waveguide structure.

Embodiments of the present disclosure provide a superconducting device. The superconducting device includes a Josephson junction and a coplanar waveguide structure. The coplanar waveguide structure is communicatively connected to the Josephson junction, wherein the coplanar waveguide structure is generated by the above-described method for preparing a coplanar waveguide structure.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms or definitions incorporated by reference.

The terms used in the embodiments of the present disclosure are for the purpose of describing particular embodiments only and are not intended to limit the present disclosure. The singular forms "a," "said," and "the" used in the embodiments of the present disclosure and the appended claims are also intended to include plural forms, unless other meanings are clearly indicated in the context, and "multiple" generally includes at least two, but does not exclude the case of including at least one.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Depending on the context, the words "in case of" and "if" as used herein may be interpreted as "at the time of" or "when" or "in response to a determination" or "in response to a detection." Similarly, depending on the context, the phrase "if determined" or "if detected (a stated condition or event)" may be interpreted as "when determined" or "in response to a determination" or "when detected (a stated condition or event)" or "in response to a detection (of a stated condition or event)."

It should be further noted that the terms "include," "comprise," or any other variations thereof are intended to cover non-exclusive inclusion, so that a commodity or system including a series of elements not only includes the elements, but also includes other elements not explicitly listed, or further includes elements inherent to the commodity or system. In the absence of more limitations, an element defined by "including a/an . . . " does not exclude that the commodity or system including the element further has other identical elements.

In addition, the sequence of steps in the following method embodiments is only an example, not a strict limitation.

In order to facilitate understanding of the technical solutions of the present application, the related technologies are briefly described below.

In a superconducting quantum computer, a large number (about 1 million) of superconducting qubits are required to achieve high-precision data operations through the superconducting qubits, and the superconducting qubits for logical operations may be composed of one or more manufactured superconducting quantum devices. Therefore, preparation of a large number of superconducting quantum devices with uniform structures is very important for the superconducting quantum computer.

Figure 1:
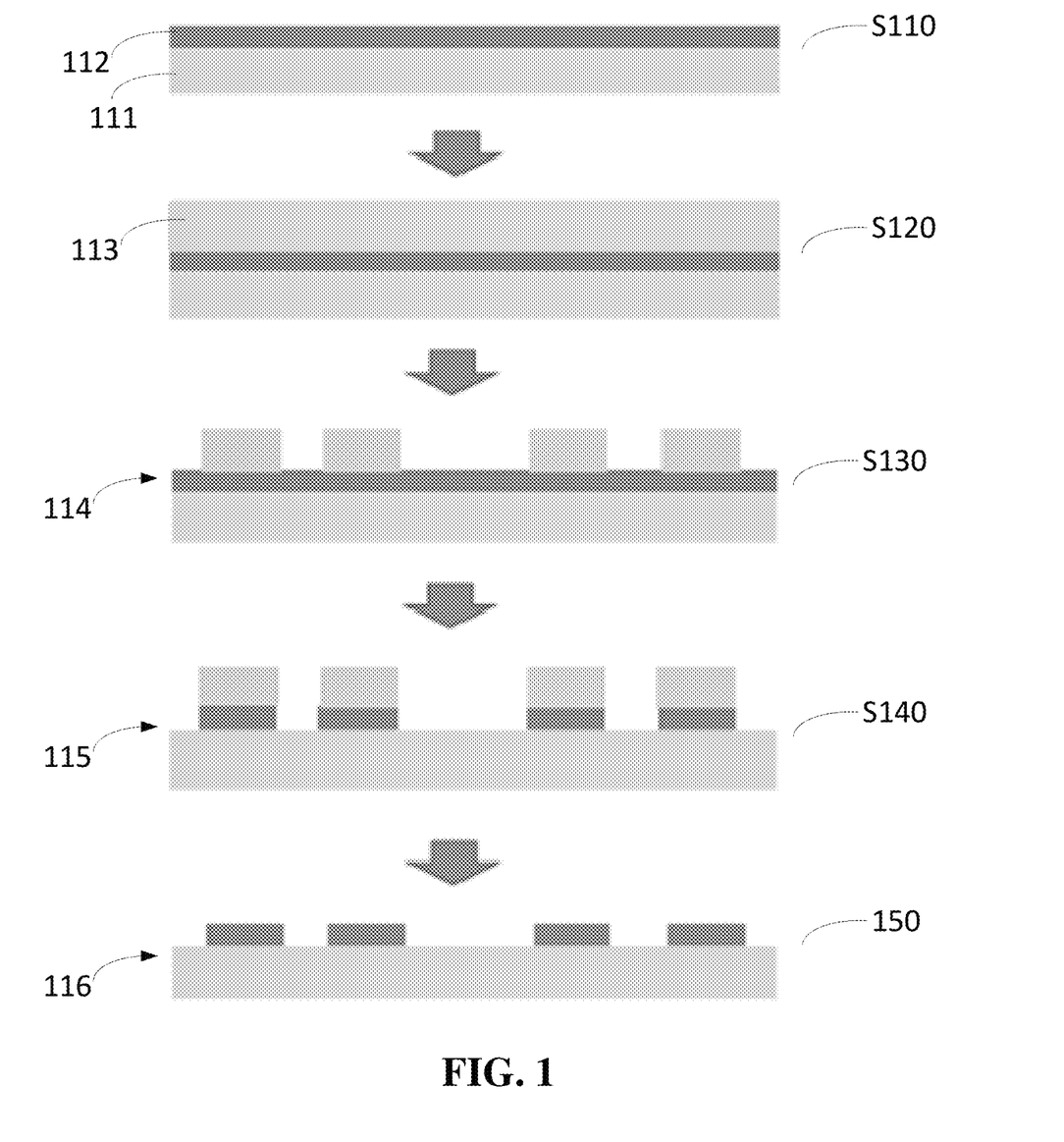
FIG. 1 is a schematic diagram of preparation of a coplanar waveguide structure, according to some embodiment of the present disclosure.

In the related art, during preparation of a superconducting quantum device, an etching operation is required. Specifically, the etching operation may generally include wet etching or plasma reactive etching. Taking the preparation of a superconducting quantum device composed of an aluminum-based material as an example, FIG. 1 is a schematic diagram of preparation of a coplanar waveguide structure. Referring to FIG. 1, a preparation process of a coplanar waveguide structure can include the following steps.

In step S110: an aluminum film 112 is deposited. Specifically, an aluminum film 112 can be deposited on a substrate structure 111 made of a silicon material. The thickness of the aluminum film can be 100 nm, 120 nm, or other thicknesses.

In step S120: a photoresist 113 is applied. Specifically, an ultraviolet photoresist can be applied at an upper end of the formed aluminum film 112.

In step S130: a photoresist development operation is performed by using a given mask to obtain a structure to be etched 114.

In step S140: an etching operation is performed, by using wet etching, on the structure to be etched 114. Specifically, the etching operation can be performed by using a type A etchant on the structure to be etched 114, and then a long-term rinsing operation is performed by using deionized water to obtain an etched structure 115 for generating a superconducting quantum device.

In step S150: a photoresist removal operation is performed on the etched structure 115 to obtain a coplanar waveguide structure 116. The coplanar waveguide 116 is used for generating a superconducting quantum device.

In general, wet etching is a method for realizing micro-nano size structure processing through mask protection and chemical reaction. It is a commonly used processing method in the field of micro-nano processing and has advantages such as simple implementation and low cost. However, the wet etching method also has certain chemo-selectivity. In a wet preparation process of aluminum-based superconducting quantum microwave waveguides, some micro-nano granular impurities are often left due to the selectivity of chemical corrosion. The charging effect of these impurities will interfere with signals of quantum devices, which will affect the preparation quality and effect of the quantum devices.

When the etching operation is performed by using a plasma reactive etching method, the aluminum is etched specifically by a chlorine-based plasma gas phase reactive etching method, so as to realize the etching operation and obtain the etched structure for generating a superconducting quantum device. However, this method has a great safety hazard due to the use of a toxic gas "chlorine".

In order to solve the technical problems existing in the above related art, the present disclosure provides a preparation method, apparatus, and device for coplanar waveguide structure, and a superconducting device. The method includes: obtaining a structure to be etched; obtaining a first etched structure by performing a first etching operation on an aluminum film provided on a substrate structure by using an acidic solution; obtaining an intermediate structure by rinsing the first etched structure; obtaining a second etched structure by performing a second etching operation on the intermediate structure by using an alkaline solution; and obtaining a target structure for generating a coplanar waveguide structure by rinsing the second etched structure again.

The preparation method, apparatus, and device for coplanar waveguide structure, and the superconducting device according to the present disclosure not only improve the conventional wet etching process method, but also realize removal of residual impurities of the chemical wet etching method by using a two-step wet etching method without redeveloping a corrosive liquid formula. Therefore, the edge flatness of an aluminum-based microwave waveguide device is improved, the quality and effect of the target structure for generating a coplanar waveguide structure is also guaranteed, and the practicability of the method is further improved.

Some implementations of the present disclosure will be described in detail below with reference to the accompanying drawings. The following embodiments and features in the embodiments can be combined with each other, provided that there is no conflict between the embodiments.

Figure 2:
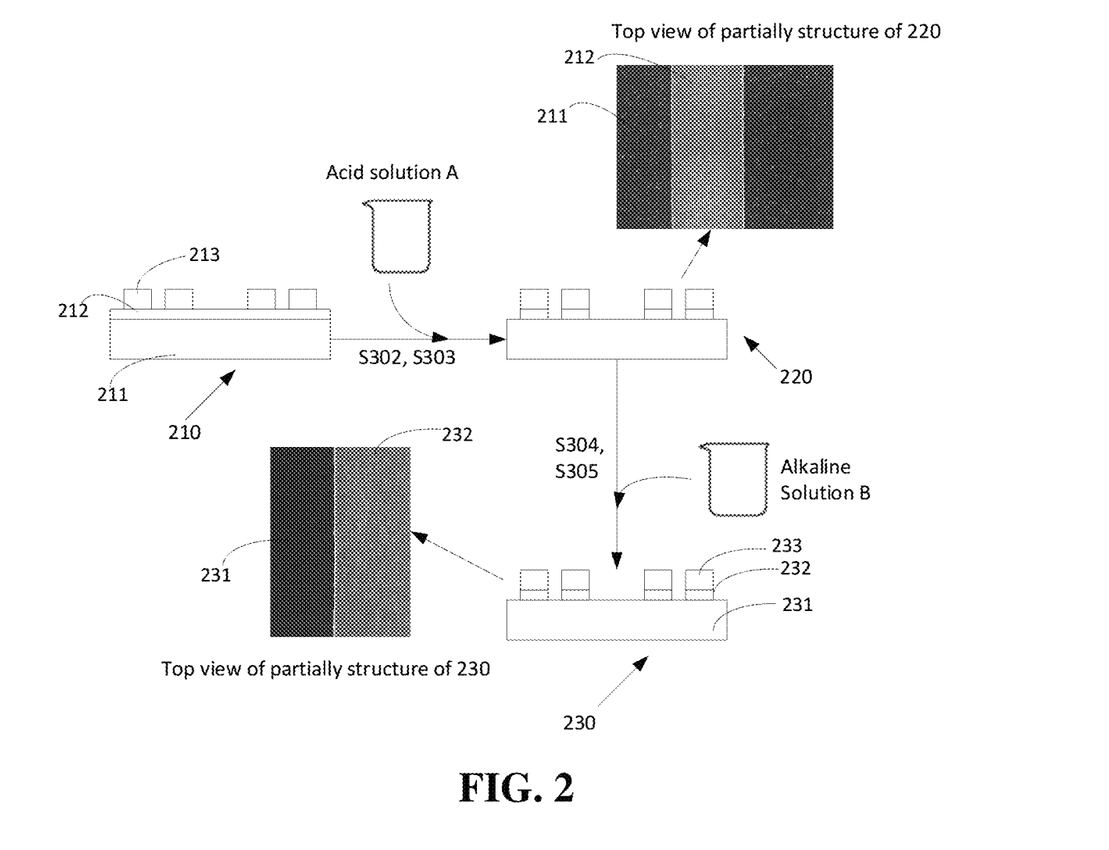
FIG. 2 is a schematic diagram of the principle of a method for preparing a coplanar waveguide structure, according to some embodiment of the present disclosure.
Figure 3:
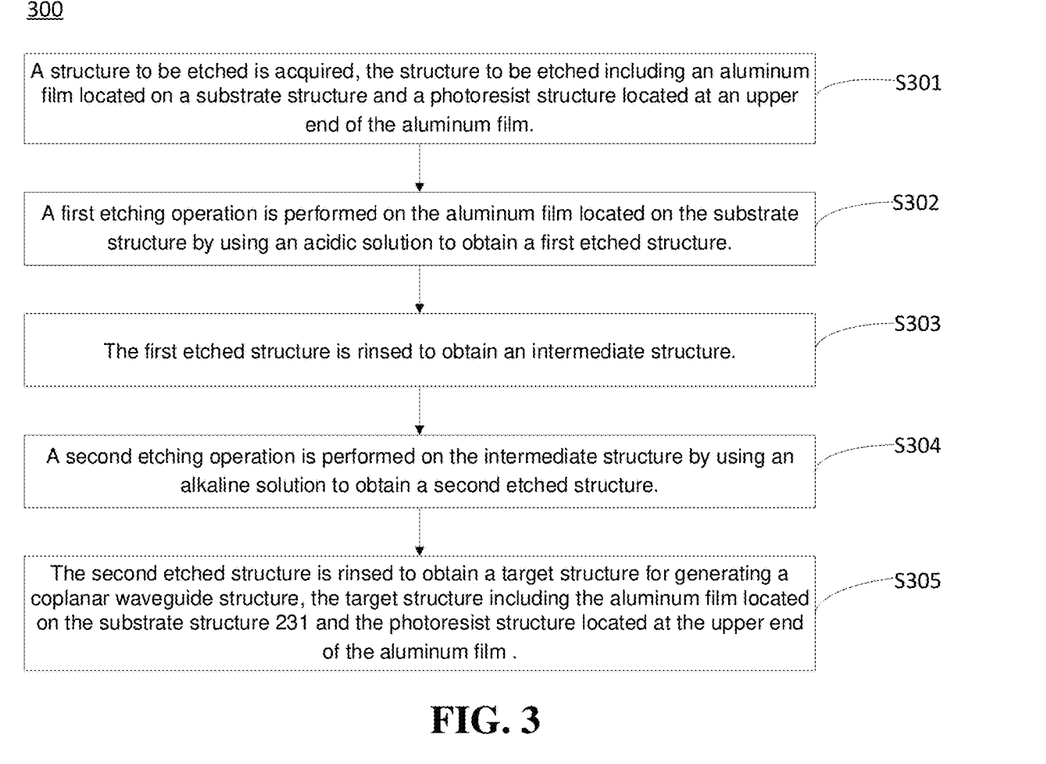
FIG. 3 is a schematic flow chart of a method for preparing a coplanar waveguide structure, according to some embodiment of the present disclosure.

FIG. 2 illustrates a schematic diagram of a preparation method for a coplanar waveguide structure according to some embodiments of the present disclosure. FIG. 3 illustrates a schematic flow chart of a preparation method 300 for a coplanar waveguide structure according to some embodiment of the present disclosure. Referring to FIG. 2 and FIG. 3, a preparation method for a coplanar waveguide structure is provided. With this method, an expensive dry etching device is not required, and a highly toxic reactive gas is not used to prepare the coplanar waveguide structure. The method can be executed by an apparatus for preparing a coplanar waveguide structure. It is understandable that the apparatus for preparing a coplanar waveguide structure can be implemented as software or a combination of software and hardware. Specifically, the preparation method can include the following steps.

At step S301, a structure to be etched is acquired. The structure to be etched includes an aluminum film provided on a substrate structure and a photoresist structure provided at an upper end of the aluminum film. The photoresist structure is configured to cover partial areas of the aluminum film.

In step S302, a first etching operation is performed on the aluminum film provided on the substrate structure by using an acidic solution to obtain a first etched structure (not shown).

In step S303, the first etched structure is rinsed to obtain an intermediate structure.

In step S304, a second etching operation is performed on the intermediate structure 220 by using an alkaline solution to obtain a second etched structure (not shown).

In step S305, the second etched structure is rinsed to obtain a target structure for generating a coplanar waveguide structure. The target structure includes the aluminum film provided on the substrate structure and the photoresist structure provided at the upper end of the aluminum film. The photoresist structure covers all areas of the aluminum film.

Implementation methods and implementation effects of the above steps are described below in detail with referencing to FIG. 2 and FIG. 3.

In step S301, a structure to be etched 210 is acquired. The structure to be etched 210 includes an aluminum film 212 provided on a substrate structure 211 and a photoresist structure 213 provided at an upper end of the aluminum film 212. The photoresist structure 213 is configured to cover partial areas of the aluminum film 212.

The structure to be etched 210 refers to a structure that needs to be etched to generate a coplanar waveguide structure. Specifically, the structure to be etched 210 can be acquired through operations such as aluminum film deposition, photoresist application, and photoresist development. The structure to be etched 210 can include a substrate structure 211, an aluminum film 212 provided on the substrate structure 211, and a photoresist structure 213 provided at an upper end of the aluminum film 212. For the aluminum film 212, those skilled in the art can adjust the thickness of the aluminum film 212 according to specific application requirements or design requirements. In addition, the photoresist structure 213 at the upper end of the aluminum film 212 can be obtained by using a mask. It is understandable that different masks can correspond to different photoresist structures, and different photoresist structures can be configured to generate different coplanar waveguide structures.

In some embodiments, step S301 acquiring a structure to be etched 210 can further include following steps: acquiring a substrate structure; depositing a material on the substrate structure to form an aluminum film; generating an ultraviolet photoresist at the upper end of the aluminum film; and performing a development operation on the ultraviolet photoresist to generate the structure to be etched.

Specifically, the substrate structure 211 can be composed of a silicon material. In order to acquire the substrate structure 211, a silicon material can be obtained, and the silicon material can be used to generate the substrate structure 211. An aluminum material can be deposited on the substrate structure 211 to generate the aluminum film 212. The thickness of the generated aluminum film 212 can be 100 nm, 120 nm, 150 nm, or the like, which can be adjusted by those skilled in the art according to specific application scenarios or application requirements. After the aluminum film 212 is generated, an ultraviolet photoresist can be generated at the upper end of the aluminum film 212, and a development operation can be performed on the ultraviolet photoresist, so that the structure to be etched 210 can be generated.

Those skilled in the art can also use other methods to acquire the structure to be etched, as long as the accuracy and reliability of the acquisition of the structure to be etched can be guaranteed, which will not be elaborated here.

In step S302, a first etching operation is performed on the aluminum film 212 provided on the substrate structure 211 by using an acidic solution A to obtain a first etched structure.

After the structure to be etched 210 is acquired, an etching operation can be performed on the structure to be etched by using an acidic solution A. Specifically, a first etching operation can be performed on the aluminum film 212 provided on the substrate structure 211 by using the acidic solution A, so that a first etched structure can be obtained.

In some embodiments, the acidic solution A can include at least one of the following: an aluminum etching solution-type A, a sulfuric acid solution, a nitric acid solution, a hydrofluoric acid solution, or a phosphoric acid solution. It is understandable that the acidic solution A not only can include solutions of the types listed above, but also can include other types of acidic solutions that can perform etching operations, as long as the quality and effect of the first etching operation performed on the aluminum film provided on the substrate structure can be guaranteed, so that the first etched structure can be obtained stably and effectively.

In step S303, the first etched structure is rinsed to obtain an intermediate structure 220.

After the first etched structure is acquired, a rinsing operation can be performed on the first etched structure by using a rinsing solution, so that an intermediate structure 220 can be obtained. In some embodiments, step S303 can further include following steps: acquiring a first rinsing parameter for performing a rinsing operation on the first etched structure; and rinsing the first etched structure by using deionized water and the first rinsing parameter to obtain the intermediate structure.

In some embodiments, the first rinsing parameter includes at least one of the following: a rinsing temperature, a rinsing volume, or a rinsing time. Specifically, in some embodiments, the rinsing temperature can be 20° C., the rinsing volume is at least 200 ml, and the etching time is 3 minutes. It is understandable that the first rinsing parameter can also be another specific value, and those skilled in the art can adjust the specific value of the first rinsing parameter according to specific application requirements and design requirements.

In addition, the specific implementation manner of acquiring the first rinsing parameter is not limited, which may be set by those skilled in the art according to specific application requirements and design requirements. For example, in some embodiments, the first rinsing parameter can be stored in a preset area, and the first rinsing parameter can be acquired by accessing the preset area. After the first rinsing parameter is acquired, the rinsing operation can be performed on the first etched structure by using deionized water and the first rinsing parameter, so that the intermediate structure can be obtained.

In step S304, a second etching operation is performed on the intermediate structure 220 by using an alkaline solution B to obtain a second etched structure.

Figure 4:
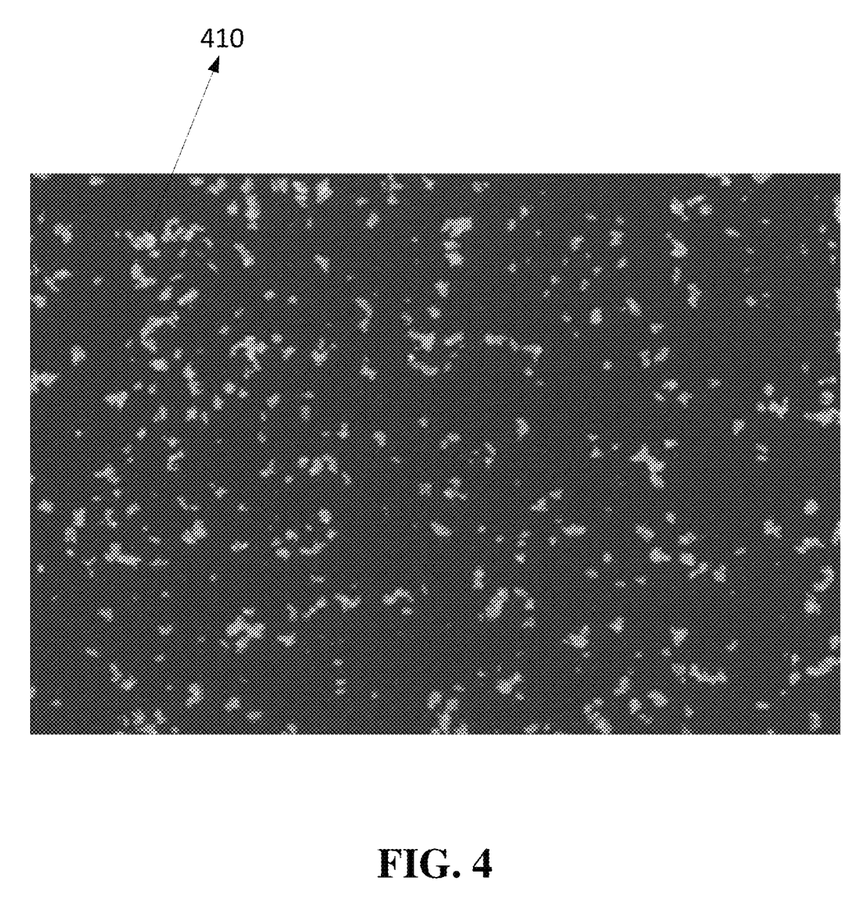
FIG. 4 is a schematic diagram of impurity particles included on a silicon substrate surface, according to some embodiment of the present disclosure.

For aluminum, in a process of vacuum deposition preparation, impurities such as an oxide (e.g., aluminum oxide $Al_2O_3$), a nitride (e.g., aluminum nitride AlN) and the like can be generated. The oxide impurity can be dissolved in an acidic solution such as phosphoric acid. Therefore, when the first etching operation is performed on the aluminum film 212 provided on the substrate structure 211 by using an acidic solution A, the oxide impurity can be removed. The nitride impurity is insoluble in an acidic solution but soluble in an alkaline solution. Therefore, after the first etching operation is performed on the aluminum film 212 provided on the substrate structure 211 by using the acidic solution A, the first etched structure can be obtained. After the first etched structure is rinsed, an intermediate structure 220 including the nitride impurity can be obtained. FIG. 4 is a schematic diagram of impurity particles included on a silicon substrate surface, according to some embodiment of the present disclosure. As shown in FIG. 4, there are white speckled impurities 410 on a surface of the silicon substrate of the intermediate structure. As shown in a top view of partially structure of 220 in FIG. 2, the edge smoothness between the substrate structure and the aluminum film is relatively low.

Referring to FIG. 2, in order to remove impurity particles included on the surface of the silicon substrate, a second etching operation can be performed on the intermediate structure by using an alkaline solution, so that a second etched structure can be obtained. In some embodiments, the alkaline solution B can include at least one of the following: a tetramethylammonium hydroxide solution, ammonia water, potassium hydroxide, sodium hydroxide, or the like. It is understandable that the alkaline solution B not only can include solution types listed above, but also can include other types of alkaline solutions that can perform etching operations, as long as the quality and effect of the second etching operation performed on the intermediate structure can be guaranteed, so that the second etched structure can be obtained stably and effectively.

In step S305, the second etched structure is rinsed to obtain a target structure 230 for generating a coplanar waveguide structure. The target structure 230 includes the aluminum film 232 provided on the substrate structure 231 and the photoresist structure 233 provided at the upper end of the aluminum film 232. The photoresist structure 233 covers all areas of the aluminum film 232.

After the second etched structure is acquired, a rinsing operation can be performed on the second etched structure by using a rinsing solution, so that the target structure 230 for generating a coplanar waveguide structure can be obtained. In some embodiments, step 305 that rinsing the second etched structure to obtain the target structure for generating a coplanar waveguide structure can further include following steps: obtaining a second rinsing parameter for performing a rinsing operation on the second etched structure; and rinsing the second etched structure by using deionized water and the second rinsing parameter to obtain the target structure for generating a coplanar waveguide structure. As shown in a top view of partially structure of 230 in FIG. 2, after the second etching operation and the rinsing operation, the substrate structure 231 does not include impurity particles, and the edge smoothness between the substrate structure and the aluminum film is relatively high.

In some embodiments, the second rinsing parameter includes at least one of the following: a rinsing temperature, a rinsing volume, or a rinsing time. Specifically, in some embodiments, the rinsing temperature can be 20° C., the rinsing volume is at least 200 ml, and the etching time is 3 minutes. It is understandable that the second rinsing parameter can also be another specific value, and those skilled in the art can adjust the specific value of the second rinsing parameter according to specific application requirements and design requirements.

In addition, the specific implementation manner of acquiring the second rinsing parameter is not limited, which may be set by those skilled in the art according to specific application requirements and design requirements. For example, in some embodiments, the second rinsing parameter can be stored in a preset area, and the second rinsing parameter can be acquired by accessing the preset area. After the second rinsing parameter is acquired, the second etched structure can be rinsed by using deionized water and the second rinsing parameter, so that the target structure for generating a coplanar waveguide structure can be obtained.

In the preparation method for a coplanar waveguide structure provided in the present disclosure, a structure to be etched is acquired; a first etching operation is performed on an aluminum film provided on the substrate structure by using an acidic solution to obtain a first etched structure; the first etched structure is rinsed to obtain an intermediate structure; a second etching operation is performed on the intermediate structure by using an alkaline solution to obtain a second etched structure; and the second etched structure is rinsed again to obtain a target structure for generating a coplanar waveguide structure. This technical solution not only improves the conventional wet etching process method, but also realizes removal of residual impurities of the chemical wet etching by using a two-step wet etching method without redeveloping a corrosive liquid formula. This method not only improves the edge flatness of an aluminum-based microwave waveguide device, but also guarantee the quality and effect of the target structure for generating a coplanar waveguide structure, and further improves the practicability.

Figure 5:
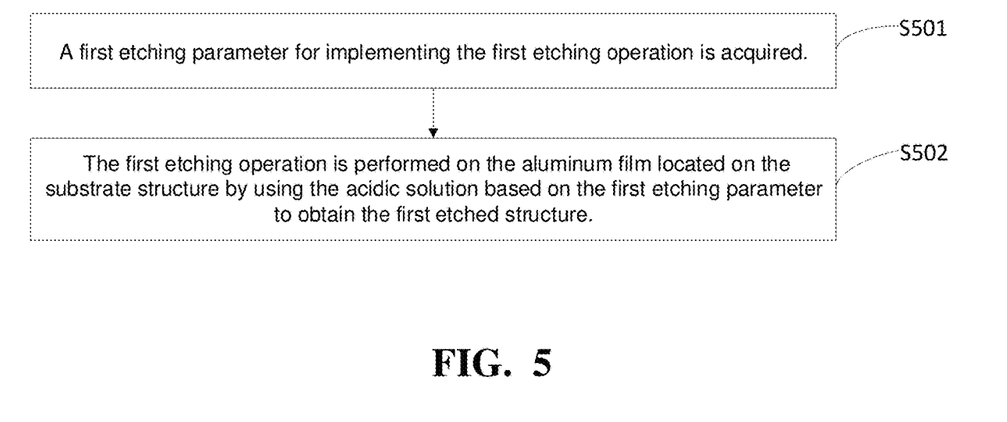
FIG. 5 is a schematic flow chart of performing a first etching operation on the aluminum film provided on the substrate structure by using an acidic solution to obtain a first etched structure, according to some embodiment of the present disclosure.

FIG. 5 illustrates a schematic flow chart of performing a first etching operation on the aluminum film provided on the substrate structure by using an acidic solution to obtain a first etched structure, according to some embodiments of the present disclosure. On the basis of the above embodiments, referring to FIG. 5, an implementation manner of performing a first etching operation on the aluminum film provided on the substrate structure by using an acidic solution is provided. Specifically, in some embodiments, the performing a first etching operation on the aluminum film provided on the substrate structure by using an acidic solution to obtain a first etched structure can include the following steps.

In step S501, a first etching parameter for implementing the first etching operation is acquired.

In step S502, the first etching operation is performed on the aluminum film provided on the substrate structure by using the acidic solution based on the first etching parameter to obtain the first etched structure.

The first etching parameter can include at least one of the following: an etching temperature, an etching volume, or an etching time. Specifically, in some embodiments, the etching temperature can be 50° C., the etching volume is at least 200 ml, and the etching time is 15 seconds. It is understandable that the first etching parameter can also be another specific value, and those skilled in the art can adjust the specific value of the first etching parameter according to specific application requirements and design requirements.

In addition, the specific implementation manner of acquiring the first etching parameter is not limited, which may be set by those skilled in the art according to specific application requirements and design requirements. For example, in some embodiments, the first etching parameter can be stored in a preset area, and the first etching parameter can be acquired by accessing the preset area. After the first etching parameter is acquired, the first etching operation can be performed on the aluminum film provided on the substrate structure by using an acidic solution based on the first etching parameter, so that the first etched structure can be obtained. Therefore, the quality and efficiency of the first etching operation are further improved.

According to some embodiments, a first etching parameter used for implementing the first etching operation is acquired, and based on the first etching parameter, the first etching operation is performed on the aluminum film provided on the substrate structure by using an acidic solution. The accuracy and reliability of acquiring the first etched structure are effectively guaranteed, and the quality and efficiency of preparing a coplanar waveguide structure are further improved.

Figure 6:
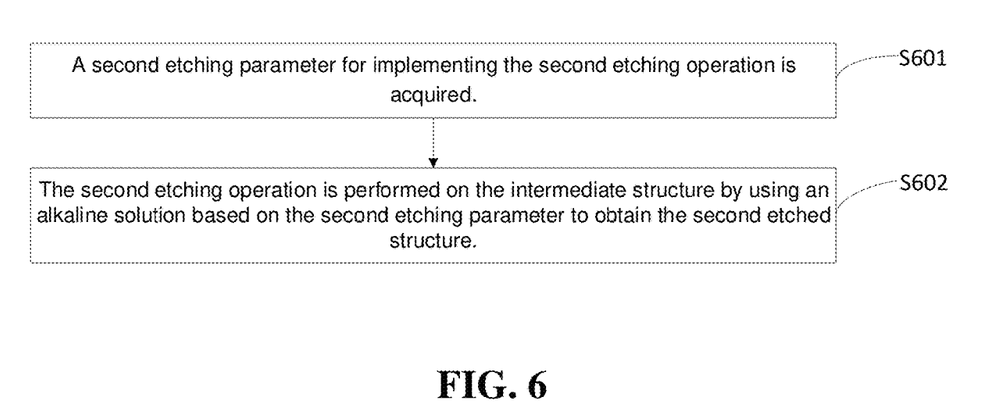
FIG. 6 is a schematic flow chart of performing a second etching operation on the intermediate structure by using an alkaline solution to obtain a second etched structure, according to some embodiment of the present disclosure.

FIG. 6 illustrates a schematic flow chart of performing a second etching operation on the intermediate structure by using an alkaline solution to obtain a second etched structure, according to some embodiments of the present disclosure. On the basis of the above embodiments, referring to FIG. 6, an implementing manner of performing a second etching operation on the intermediate structure by using an alkaline solution to obtain the second etched structure is provided. Specifically, in some embodiments, the performing a second etching operation on the intermediate structure by using an alkaline solution to obtain a second etched structure can include the following steps.

In step S601, a second etching parameter for implementing the second etching operation is acquired.

In step S602, the second etching operation is performed on the intermediate structure by using an alkaline solution based on the second etching parameter to obtain the second etched structure.

The second etching parameter includes at least one of the following: an etching temperature, an etching volume, or an etching time. Specifically, in some embodiments, the etching temperature can be 20° C., the etching volume can be at least 200 ml, and the etching time can be 20 s. It is understandable that the second etching parameter can also be another specific value. For example, in some embodiments, the etching time can be 5 s, 10 s, or 15 s, etc., and those skilled in the art can adjust the specific value of the second etching parameter according to specific application requirements and design requirements. It should be noted that the etching quality and effect can be increased with an increase of the etching time, that is, the etching effect with an etching time of 4 s is lower than the etching effect with an etching time of 10 s, and the etching effect with an etching time of 10 s is lower than the etching effect with an etching time of 15 s.

In addition, the specific implementation manner of acquiring the second etching parameter is not limited, which may be set by those skilled in the art according to specific application requirements and design requirements. For example, in some embodiments, the second etching parameter can be stored in a preset area, and the second etching parameter can be acquired by accessing the preset area. After the second etching parameter is acquired, the second etching operation can be performed on the intermediate structure by using an alkaline solution based on the second etching parameter, so that the second etched structure can be obtained. Therefore, the quality and efficiency of the second etching operation are further improved.

According to the above embodiments, the second etching parameter used for implementing the second etching operation is acquired, and based on the second etching parameter, the second etching operation is performed on the intermediate structure by using an alkaline solution to obtain the second etched structure. The accuracy and reliability of acquiring the second etched structure are effectively guaranteed, and the quality and efficiency of preparing a coplanar waveguide structure are further improved.

In some embodiments, after the target structure for generating a coplanar waveguide structure is obtained, the method can further include removing the photoresist on the target structure to generate a coplanar waveguide structure. The coplanar waveguide structure includes: a substrate structure and an aluminum film provided on the substrate structure. The aluminum film covers partial areas of the substrate structure.

After the target structure is acquired, the photoresist on the target structure can be removed, so that a coplanar waveguide structure can be generated. The generated coplanar waveguide structure can be used for generating a superconducting quantum device. Specifically, in some embodiments, the coplanar waveguide structure can include a substrate structure and an aluminum film provided on the substrate structure. The aluminum film can cover partial areas of the substrate structure.

According to the above embodiment, by removing the photoresist provided on the target structure, a coplanar waveguide structure can be generated. The generated coplanar waveguide structure can be used for generating a superconducting quantum device. Therefore, the quality and efficiency of preparing superconducting quantum devices are further improved.

Figure 7:
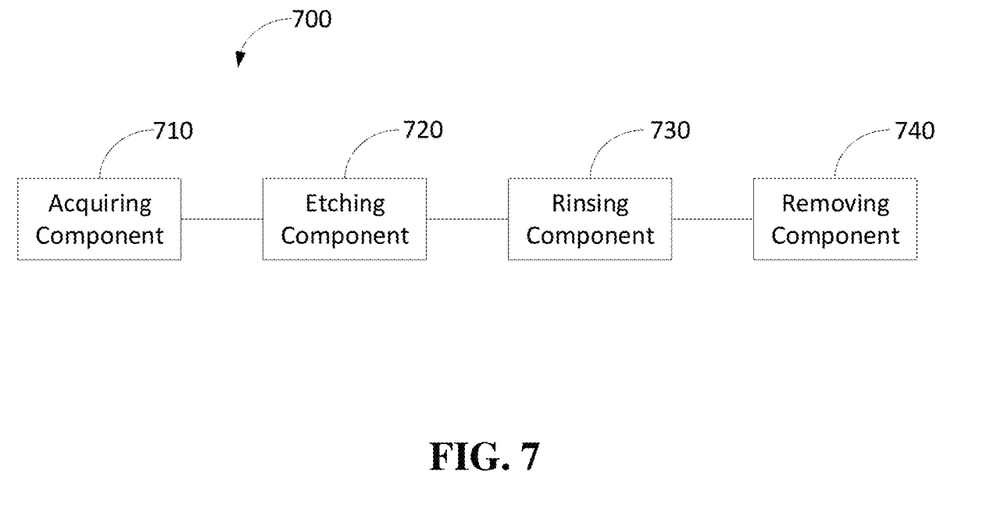
FIG. 7 is a schematic structural diagram of an apparatus for preparing a coplanar waveguide structure, according to some embodiment of the present disclosure.

FIG. 7 illustrates a schematic structural diagram of an apparatus 700 for preparing a coplanar waveguide structure according to some embodiments of the present disclosure. Referring to FIG. 7, an apparatus 700 for preparing a coplanar waveguide structure is provided. The apparatus for preparing a coplanar waveguide structure can perform the method for preparing a coplanar waveguide structure shown in FIG. 3. Specifically, in some embodiments, the apparatus 700 for preparing a coplanar waveguide structure can include an acquiring component 710, an etching component 720 and a rinsing component 730. It is understandable that each component can include one or more hardware components, for example, circuitry, for performing corresponding functions.

The acquiring component 710 is configured to acquire a structure to be etched. The structure to be etched includes an aluminum film provided on a substrate structure and a photoresist structure provided at an upper end of the aluminum film. The photoresist structure is configured to cover partial areas of the aluminum film.

The etching component 720 is configured to perform a first etching operation on the aluminum film provided on the substrate structure by using an acidic solution to obtain a first etched structure.

The rinsing component 730 is configured to rinse the first etched structure to obtain an intermediate structure.

The etching component 720 is further configured to perform a second etching operation on the intermediate structure by using an alkaline solution to obtain a second etched structure.

The rinsing component 730 is further configured to rinse the second etched structure to obtain a target structure for generating a coplanar waveguide structure. The target structure includes the aluminum film provided on the substrate structure and the photoresist structure provided at the upper end of the aluminum film. The photoresist structure covers all areas of the aluminum film.

In some embodiments, when performing the first etching operation on the aluminum film provided on the substrate structure by using an acidic solution to obtain the first etched structure, the etching component 720 is further configured to: acquire a first etching parameter for implementing the first etching operation; and perform the first etching operation on the aluminum film provided on the substrate structure by using the acidic solution based on the first etching parameter to obtain the first etched structure.

In some embodiments, the first etching parameter includes at least one of the following: an etching temperature, an etching volume, or an etching time.

In some embodiments, the acidic solution includes at least one of the following: an aluminum etching solution-type A, a sulfuric acid solution, a nitric acid solution, a hydrofluoric acid solution, or a phosphoric acid solution.

In some embodiments, when rinsing the first etched structure to obtain the intermediate structure, the rinsing component 730 is further configured to: acquire a first rinsing parameter for performing a rinsing operation on the first etched structure; and rinse the first etched structure by using deionized water and the first rinsing parameter to obtain the intermediate structure.

In some embodiments, the first rinsing parameter includes at least one of the following: a rinsing temperature, a rinsing volume, or a rinsing time.

In some embodiments, when performing the second etching operation on the intermediate structure by using the alkaline solution to obtain the second etched structure, the etching component 720 is further configured to: acquire a second etching parameter for implementing the second etching operation; and perform the second etching operation on the intermediate structure by using the alkaline solution based on the second etching parameter to obtain the second etched structure.

In some embodiments, the second etching parameter includes at least one of the following: an etching temperature, an etching volume, and an etching time.

In some embodiments, the alkaline solution includes at least one of the following: a tetramethylammonium hydroxide solution, ammonia water, potassium hydroxide, or sodium hydroxide.

In some embodiments, when rinsing the second etched structure to obtain the target structure for generating a coplanar waveguide structure, the rinsing component 730 is further configured to: obtain a second rinsing parameter for performing a rinsing operation on the second etched structure; and rinse the second etched structure by using deionized water and the second rinsing parameter to obtain the target structure for generating a coplanar waveguide structure.

In some embodiments, the second rinsing parameter includes at least one of the following: a rinsing temperature, a rinsing volume, or a rinsing time.

In some embodiments, after the target structure for generating a coplanar waveguide structure is obtained, the preparation apparatus 700 can further include a removing component 740. The removing component 740 is configured to remove the photoresist on the target structure to generate a coplanar waveguide structure. The coplanar waveguide structure includes: the substrate structure and the aluminum film provided on the substrate structure. The aluminum film covers partial areas of the substrate structure.

In some embodiments, when acquiring a structure to be etched, the acquiring component 710 is further configured to: acquire a substrate structure, deposit a material on the substrate structure to form an aluminum film, generate an ultraviolet photoresist at the upper end of the aluminum film, and perform a development operation on the ultraviolet photoresist to generate the structure to be etched.

The apparatus shown in FIG. 7 can perform the method of the embodiments shown in FIG. 2 to FIG. 6. For the parts that are not described in detail here, reference can be made to the related description of the embodiments shown in FIG. 2 to FIG. 6. For the implementation process and technical effects of the apparatus, reference can be made to the description in the embodiment shown in FIG. 2 to FIG. 6, which will not be further described here.

Figure 8:
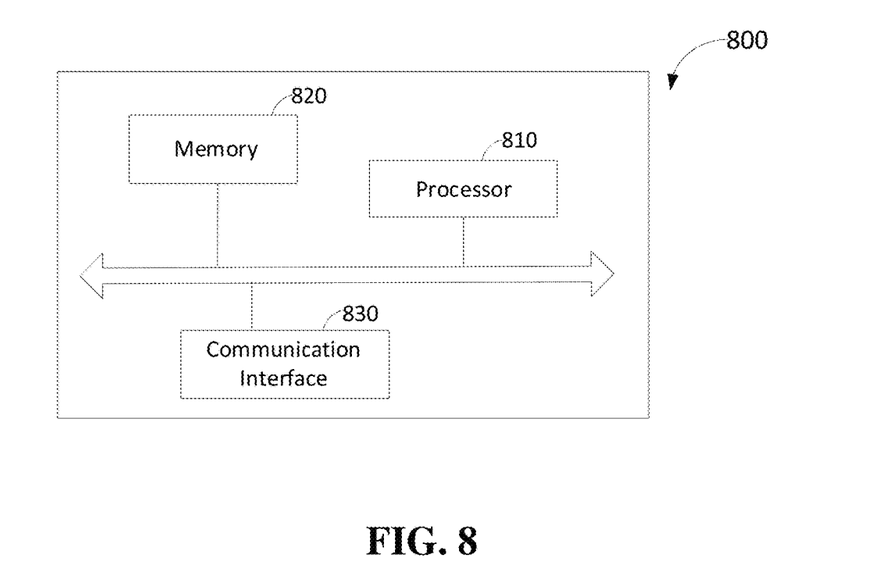
FIG. 8 is a schematic structural diagram of an electronic device corresponding to the apparatus for preparing a coplanar waveguide structure according to the embodiments shown in FIG. 7.

In a possible design, the structure of the apparatus for preparing a coplanar waveguide structure shown in FIG. 7 can be implemented as an electronic device, which can be implemented as various devices such as a mobile phone, a tablet computer, and a server. FIG. 8 illustrates a schematic structural diagram of an electronic device 800 corresponding to the apparatus for preparing a coplanar waveguide structure according to the embodiment shown in FIG. 7. As shown in FIG. 8, the electronic device 800 includes: a processor 810 and a memory 820. Memory 820 is configured to store a program for a corresponding electronic device to perform the method for preparing a coplanar waveguide structure provided in the embodiments shown in FIG. 2 to FIG. 6, and processor 810 is configured to execute the program stored in memory 820.

The program includes one or more computer instructions, wherein the one or more computer instructions, when executed by processor 810, can implement the method provided in the embodiments shown in FIG. 2 to FIG. 6.

In some embodiments, the structure of the electronic device further includes a communication interface 830 for the electronic device 800 to communicate with another device or a communication network.

In addition, a computer storage medium for storing computer software instructions used by an electronic device is provided in an embodiment of the present disclosure, which includes involved programs for performing the preparation method for a coplanar waveguide structure in the method embodiments shown in FIG. 2 to FIG. 6.

Figure 9:
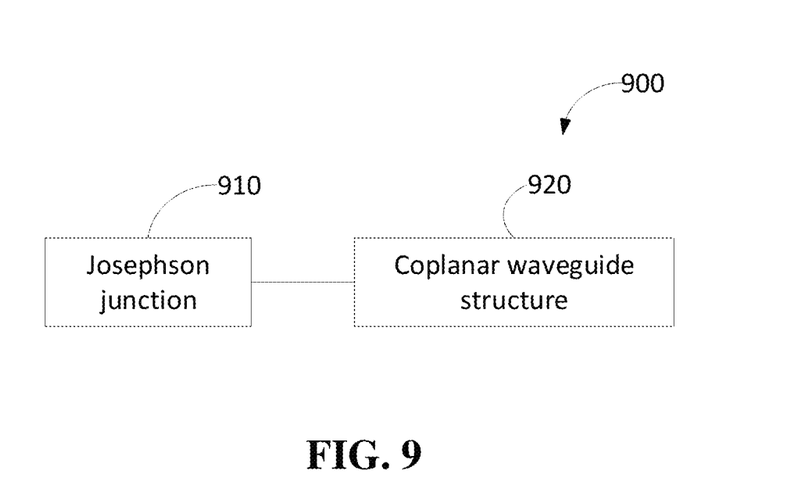
FIG. 9 is a schematic structural diagram of a superconducting device, according to some embodiment of the present disclosure.

FIG. 9 illustrates a schematic structural diagram of a superconducting device 900, according to some embodiments of the present disclosure. Referring to FIG. 9, a superconducting device 900 is provided. The superconducting device 900 includes a Josephson junction 910 and a coplanar waveguide structure 920. Coplanar waveguide structure 920 and Josephson junction 910 are communicatively connected. Coplanar waveguide structure 920 is generated by the above described preparation method for a coplanar waveguide structure shown in FIG. 2 to FIG. 6.

The implementation principle and implementation effect of the superconducting device shown in FIG. 9 are similar to the implementation principle and implementation effect of the method for preparing a coplanar waveguide structure of FIG. 2 to FIG. 6. Specific description can be obtained with reference to the description in the embodiments shown in FIG. 2 to FIG. 6, which will not be further described here.

The embodiments may further be described using the following clauses:

1. A method for preparing a coplanar waveguide structure, comprising:
   acquiring a structure to be etched, the structure to be etched comprising an aluminum film provided on a substrate structure and a photoresist structure provided at an upper end of the aluminum film, wherein the photoresist structure is configured to cover partial areas of the aluminum film;
   performing a first etching operation on the aluminum film provided on the substrate structure by using an acidic solution to obtain a first etched structure;
   rinsing the first etched structure to obtain an intermediate structure;
   performing a second etching operation on the intermediate structure by using an alkaline solution to obtain a second etched structure; and
   rinsing the second etched structure to obtain a target structure for generating a coplanar waveguide structure, the target structure comprising the aluminum film provided on the substrate structure and the photoresist structure provided at the upper end of the aluminum film, wherein the photoresist structure covers all areas of the aluminum film.

2. The method according to clause 1, wherein performing the first etching operation on the aluminum film provided on the substrate structure by using the acidic solution to obtain the first etched structure further comprises:
   acquiring a first etching parameter for implementing the first etching operation; and
   performing the first etching operation on the aluminum film provided on the substrate structure by using the acidic solution based on the first etching parameter to obtain the first etched structure.

3. The method according to clause 2, wherein the first etching parameter comprises at least one of the following: an etching temperature, an etching volume, or an etching time.

4. The method according to any one of clauses 1 to 3, wherein the acidic solution comprises at least one of the following: an aluminum etching solution-type A, a sulfuric acid solution, a nitric acid solution, a hydrofluoric acid solution, or a phosphoric acid solution.

5. The method according to any one of clauses 1 to 4, wherein rinsing the first etched structure to obtain the intermediate structure further comprises:
   acquiring a first rinsing parameter for performing a rinsing operation on the first etched structure; and
   rinsing the first etched structure by using deionized water and the first rinsing parameter to obtain the intermediate structure.

6. The method according to clause 5, wherein the first rinsing parameter comprises at least one of the following: a rinsing temperature, a rinsing volume, or a rinsing time.

7. The method according to any one of clauses 1 to 6, wherein performing the second etching operation on the intermediate structure by using the alkaline solution to obtain the second etched structure comprises:
   acquiring a second etching parameter for implementing the second etching operation; and
   performing the second etching operation on the intermediate structure by using the alkaline solution based on the second etching parameter to obtain the second etched structure.

8. The method according to clause 7, wherein the second etching parameter comprises at least one of the following: an etching temperature, an etching volume, or an etching time.

9. The method according to any one of clauses 1 to 8, wherein the alkaline solution comprises at least one of the following: a tetramethylammonium hydroxide solution, ammonia water, potassium hydroxide, or sodium hydroxide.

10. The method according to any one of clauses 1 to 9, wherein rinsing the second etched structure to obtain the target structure for generating the coplanar waveguide structure further comprises:
    acquiring a second rinsing parameter for performing a rinsing operation on the second etched structure; and
    rinsing the second etched structure by using deionized water and the second rinsing parameter to obtain the target structure for generating a coplanar waveguide structure.

11. The method according to clause 10, wherein the second rinsing parameter comprises at least one of the following: a rinsing temperature, a rinsing volume, or a rinsing time.

12. The method according to any one of clauses 1 to 11, wherein after the target structure for generating a coplanar waveguide structure is obtained, the method further comprises:
    removing the photoresist on the target structure to generate the coplanar waveguide structure, wherein the coplanar waveguide structure comprises the substrate structure and the aluminum film provided on the substrate structure, the aluminum film covering partial areas of the substrate structure.

13. The method according to any one of clauses 1 to 11, wherein acquiring the structure to be etched comprises:
    acquiring a substrate structure;
    depositing a material on the substrate structure to form an aluminum film;
    generating an ultraviolet photoresist at an upper end of the aluminum film; and
    performing a developing operation on the ultraviolet photoresist to generate the structure to be etched.

14. An apparatus for preparing a coplanar waveguide structure, the apparatus is configured to acquire a structure to be etched, the structure to be etched comprising an aluminum film provided on a substrate structure and a photoresist structure provided at an upper end of the aluminum film, wherein the photoresist structure is configured to cover partial areas of the aluminum film, the apparatus comprising
    an etching component configured to perform a first etching operation on the aluminum film provided on the substrate structure by using an acidic solution to obtain a first etched structure and configured to perform a second etching operation on the intermediate structure by using an alkaline solution to obtain a second etched structure; and a rinsing component configured to rinse the first etched structure to obtain an intermediate structure and configured to rinse the second etched structure to obtain a target structure for generating a coplanar waveguide structure, wherein the target structure comprises the aluminum film provided on the substrate structure and the photoresist structure provided at the upper end of the aluminum film, and the photoresist structure covers all areas of the aluminum film.

15. A device for preparing a coplanar waveguide structure, comprising: a memory and a processor, wherein the memory is configured to store one or more computer instructions, and the one or more computer instructions, when executed by the processor, implement the method for preparing a coplanar waveguide structure according to any one of clauses 1 to 13.

16. A superconducting device, comprising: a Josephson junction and a coplanar waveguide structure, the coplanar waveguide structure being communicatively connected to the Josephson junction, wherein the coplanar waveguide structure is generated by the method for preparing a coplanar waveguide structure according to any one of clauses 1 to 13.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described components/units may be combined as one component/unit, and each of the above described components/units may be further divided into a plurality of sub-components/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A preparation method for a coplanar waveguide structure, comprising:
    acquiring a structure to be etched, the structure to be etched comprising an aluminum film provided on a substrate structure and a photoresist structure provided at an upper end of the aluminum film, wherein the photoresist structure is configured to cover partial areas of the aluminum film;
    performing a first etching operation on the aluminum film provided on the substrate structure by using an acidic solution to obtain a first etched structure;
    rinsing the first etched structure to obtain an intermediate structure;
    performing a second etching operation on the intermediate structure by using an alkaline solution to obtain a second etched structure; and
    rinsing the second etched structure to obtain a target structure for generating a coplanar waveguide structure, the target structure comprising the aluminum film provided on the substrate structure and the photoresist structure provided at the upper end of the aluminum film, wherein the photoresist structure covers all areas of the aluminum film.

2. The method according to claim 1, wherein performing the first etching operation on the aluminum film provided on the substrate structure by using the acidic solution to obtain the first etched structure further comprises:
    acquiring a first etching parameter for implementing the first etching operation; and
    performing the first etching operation on the aluminum film provided on the substrate structure by using the acidic solution based on the first etching parameter to obtain the first etched structure.

3. The method according to claim 2, wherein the first etching parameter comprises at least one of the following: an etching temperature, an etching volume, or an etching time.

4. The method according to claim 1, wherein the acidic solution comprises at least one of the following: an aluminum etching solution-type A, a sulfuric acid solution, a nitric acid solution, a hydrofluoric acid solution, or a phosphoric acid solution.

5. The method according to claim 1, wherein rinsing the first etched structure to obtain the intermediate structure further comprises:

acquiring a first rinsing parameter for performing a rinsing operation on the first etched structure; and rinsing the first etched structure by using deionized water and the first rinsing parameter to obtain the intermediate structure.

6. The method according to claim 5, wherein the first rinsing parameter comprises at least one of the following: a rinsing temperature, a rinsing volume, or a rinsing time.

7. The method according to claim 1, wherein performing the second etching operation on the intermediate structure by using the alkaline solution to obtain the second etched structure comprises:

acquiring a second etching parameter for implementing the second etching operation; and performing the second etching operation on the intermediate structure by using the alkaline solution based on the second etching parameter to obtain the second etched structure.

8. The method according to claim 7, wherein the second etching parameter comprises at least one of the following: an etching temperature, an etching volume, or an etching time.

9. The method according to claim 1, wherein the alkaline solution comprises at least one of the following: a tetramethylammonium hydroxide solution, ammonia water, potassium hydroxide, or sodium hydroxide.

10. The method according to claim 1, wherein rinsing the second etched structure to obtain the target structure for generating the coplanar waveguide structure further comprises:

acquiring a second rinsing parameter for performing a rinsing operation on the second etched structure; and rinsing the second etched structure by using deionized water and the second rinsing parameter to obtain the target structure for generating a coplanar waveguide structure.

11. The method according to claim 10, wherein the second rinsing parameter comprises at least one of the following: a rinsing temperature, a rinsing volume, or a rinsing time.

12. The method according to claim 1, wherein after the target structure for generating a coplanar waveguide structure is obtained, the method further comprises:

removing the photoresist on the target structure to generate the coplanar waveguide structure, wherein the coplanar waveguide structure comprises the substrate structure and the aluminum film provided on the substrate structure, the aluminum film covering partial areas of the substrate structure.

13. The method according to claim 1, wherein acquiring the structure to be etched comprises:

acquiring a substrate structure;

depositing a material on the substrate structure to form an aluminum film;

generating an ultraviolet photoresist at an upper end of the aluminum film; and performing a developing operation on the ultraviolet photoresist to generate the structure to be etched.

14. An apparatus for preparing a coplanar waveguide structure, the apparatus is configured to acquire a structure to be etched, the structure to be etched comprising an aluminum film provided on a substrate structure and a photoresist structure provided at an upper end of the aluminum film, wherein the photoresist structure is configured to cover partial areas of the aluminum film, the apparatus comprising an etching component configured to perform a first etching operation on the aluminum film provided on the substrate structure by using an acidic solution to obtain a first etched structure and configured to perform a second etching operation on the intermediate structure by using an alkaline solution to obtain a second etched structure; and a rinsing component configured to rinse the first etched structure to obtain an intermediate structure and configured to rinse the second etched structure to obtain a target structure for generating a coplanar waveguide structure, wherein the target structure comprises the aluminum film provided on the substrate structure and the photoresist structure provided at the upper end of the aluminum film, and the photoresist structure covers all areas of the aluminum film.

15. A device for preparing a coplanar waveguide structure, comprising: a memory and a processor, wherein the memory is configured to store one or more computer instructions, and the one or more computer instructions, when executed by the processor, cause the apparatus to initiate a method for preparing a coplanar waveguide structure, the method comprising:

acquiring a structure to be etched, the structure to be etched comprising an aluminum film provided on a substrate structure and a photoresist structure provided at an upper end of the aluminum film, wherein the photoresist structure is configured to cover partial areas of the aluminum film;

performing a first etching operation on the aluminum film provided on the substrate structure by using an acidic solution to obtain a first etched structure;

performing a rinsing of the first etched structure to obtain an intermediate structure;

performing a second etching operation on the intermediate structure by using an alkaline solution to obtain a second etched structure; and performing a rinsing of the second etched structure to obtain a target structure for generating a coplanar waveguide structure, the target structure comprising the aluminum film provided on the substrate structure and the photoresist structure provided at the upper end of the aluminum film, wherein the photoresist structure covers all areas of the aluminum film.

16. A superconducting device, comprising: a Josephson junction and a coplanar waveguide structure, the coplanar waveguide structure being communicatively connected to the Josephson junction, wherein the coplanar waveguide structure is generated by the method for preparing a coplanar waveguide structure according claim 1.

* * * * *